United States Patent [19]

Tsukisaka et al.

[11] 4,090,634
[45] May 23, 1978

[54] CLOSURE CAP FOR A LIQUID STORING VESSEL

[75] Inventors: Tsuneo Tsukisaka, Kawagoe; Sigehiro Maruoka, Oomiya, both of Japan

[73] Assignee: Honda Giken Kogyo Kabushiki Kaisha, Tokyo, Japan

[21] Appl. No.: 818,605

[22] Filed: Jul. 25, 1977

[30] Foreign Application Priority Data

Jul. 26, 1976  Japan ............................. 51-99440[U]
Jul. 26, 1976  Japan ............................. 51-99441[U]

[51] Int. Cl.² .................... B65D 41/06; B65D 41/16
[52] U.S. Cl. ............................ 220/302; 220/DIG. 33; 220/295
[58] Field of Search ............ 220/293, 295, 301, 302, 220/303, 304, DIG. 32, DIG. 33

[56] References Cited

U.S. PATENT DOCUMENTS

| 1,654,065 | 12/1927 | Zarobsky | 220/301 |
| 1,720,349 | 7/1929 | Reid | 220/301 |

Primary Examiner—George T. Hall
Attorney, Agent, or Firm—Polster, Polster and Lucchesi

[57] ABSTRACT

A closure cap for a liquid storing vessel or tank which is constructed with a liquid storing tank having a liquid filling port formed in a predetermined part thereof, a mouth piece fitted in the liquid filling port and having an inwardly extending flanged part, a closure cap to be fitted in the mouth piece in the liquid filling port, a sealing member interposed between the lower surface of the closure cap and the inwardly extending flanged part of the mouth piece fitted in the liquid filling port, a ring-shaped raised part formed between the top peripheral edge of the mouth piece and the inwardly extending flanged part thereof, a ring-shaped flat plate part forming a part of the sealing member to intimately contact with the lower surface of the closure cap, a ring-shaped lip part which is integrally joined with the lower part of the ring-shaped flat plate part through a connecting part and which is intimately contacted with a downwardly inclined inner peripheral surface of the ring-shaped raised part defined between the top periphery of the mouth piece and the inwardly extending flanged part, and a ring-shaped slit defined in the inner peripheral surface of the connecting part, and between the lower surface of the flat plate part and the lip part.

28 Claims, 3 Drawing Figures

CLOSURE CAP FOR A LIQUID STORING VESSEL

BACKGROUND OF THE INVENTION

This invention relates to a closure cap device for a container, and, more particularly, it is concerned with such closure cap device for a volatile liquid fuel storing tank of, for example, an automobile, a motor-cycle, and so forth.

It may sometimes be experienced that, if a sealing condition between the closure cap and a fuel filling port of the fuel storing tank is incomplete, vapor of the fuel are prone to leak out of the fuel tank through the fuel filling port, particularly when the fuel storing tank is heated under the immense heat of the sun in the summer time, for example, and the vapor pressure within the tank becomes very high. This leaked-out vapor of the fuel becomes a cause for the atmospheric contamination, or the so-called "air pollution," so that it is mandatory that leakage of the fuel vapor should be prevented from occurring by making complete the sealing condition between the closure cap and the fuel filling port of the fuel storing tank.

The conventionally practised structure for the closure cap for the fuel storing vessel has been such that a piece of a rubber sealing material is interposed between the closure cap and a flange of the fuel filling port so that the sealing rubber material may be simply compressed between the closure cap and the flange of the fuel filling port by a repulsive force of a compression coil spring provided in the closure cap, which is the so-called "bayonet type" cap tightening system.

In the above-described construction of the closure cap device, the effect to be derived from the sealing rubber material depends upon the repulsive force of the compression coil spring. Therefore, if the repulsive force is made large, satisfactory sealing effect can be obtained. On the other hand, however, it has such disadvantage that the fitting and removing operations of the closure cap becomes rather difficult and troublesome.

SUMMARY OF THE INVENTION

In view of the various problems inherent in the conventional closure cap device for the fuel storing device as described in the foregoing, it is the primary object of the present invention to provide an improved closure cap device which is capable of performing a perfect sealing between the closure cap and the flanged part of the fuel storing vessel, and of eliminating any inconvenience of the fuel vapor to leak outside, even when the vapor pressure within the vessel becomes increased.

According to the present invention, generally speaking, there is provided a closure cap device for a liquid storing vessel which comprises in combination: a liquid storing tank having a liquid feeding port formed in one part thereof, a mouth piece fitted in the liquid filling port and having an inwardly extending flanged part, a closure cap to close the liquid feeding port, and a sealing member interposed between the lower surface of the closure cap and the outer surface of the inwardly extended flanged part of the mouth piece fitted in the liquid feeding port facing the closure cap, wherein the inwardly extending flanged part of the mouth piece fitted in the liquid feeding port of the liquid storing vessel has a ring-shaped raised part defined at a position between the top peripheral edge of the mouth piece and the inwardly extending flanged part thereof, and the abovementioned sealing member is in such a configuration that is integrally composed of a ring-shaped flat plate part to be intimately contacted with the lower surface of the closure cap, a ring-shaped lip part which is joined to the lower part of the flat plate part through a connecting part, and intimately contacted with a downwardly inclined inner peripheral surface of the ring-shaped raised part, and ring-shaped slit formed in the inner peripheral surface of the abovementioned connecting part, and between the lower surface of the flat plate part and the lip part.

There has thus been outlined rather broadly the more important feature of the present invention in order that the detailed description thereof that follows may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures for carrying out the several purposes of the invention. It is important therefore that the claims be regarded as including such equivalent constructions to an extent that they do not depart from the spirit and scope of the invention.

BRIEF DESCRIPTION OF THE ACCOMPANYING DRAWING

Specific embodiment of the present invention has been chosen for the purpose of illustration and description, and is shown in the accompanying drawings, forming a part of the specification, in which.

DETAILED DESCRIPTION OF PREFERRED EMBODIMENTS

In the following, the present invention will be explained in more detail in reference to a preferred embodiment thereof.

Figure 1:
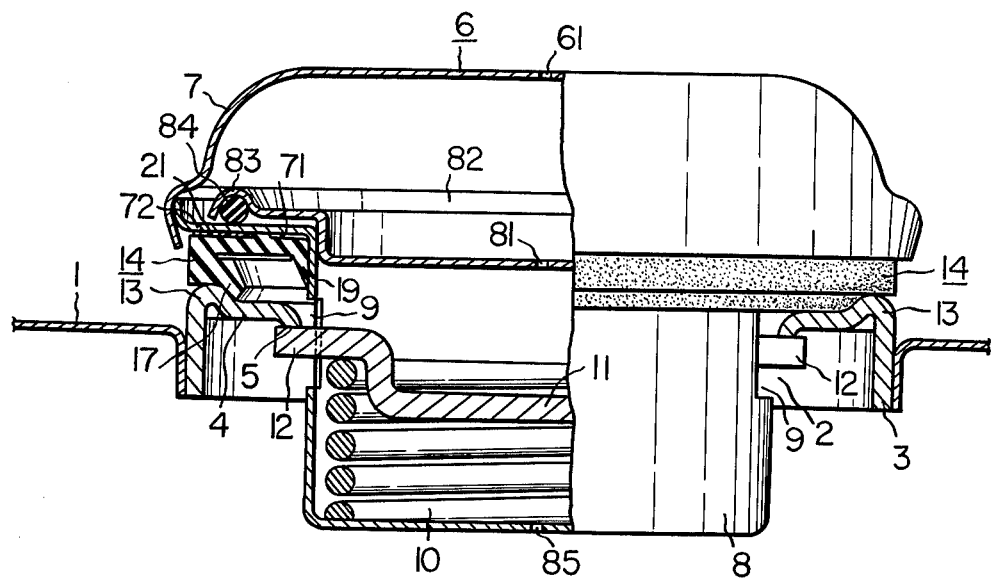
FIG. 1 is a side elevational view, partly in cross-section, of a closure cap device according to the present invention in its state of being tightened to the liquid feeding port of the liquid storing vessel.

At the outset, a construction of a conventional bayonnet type closure cap tightening device, to which improvement according to the present invention is to apply, will be described in reference to FIG. 1.

A fuel tank main body 1 has a fuel feeding or filling port 2 in one part thereof. A cylindrical mouth piece 3 is fitted into a circumferential brim part of the fuel feeding port, and, from the top edge 13 of this cylindrical mouth piece 3, there extends a flanged part 4 inwardly of the fuel feeding port 2. On the lower end surface part of this inwardly extended flanged part 4 of the mouth piece 3, there is formed a cam face 5 which is in inclination along the circumferential direction of the cylindrical mouth piece.

A closure cap 6 assumes a "rivet" shape consisting of a heat part 7 and a barrel part 8 which is integral with the head part 7 and extends downwardly from it to a certain length. The cylinder or barrel part 8 has a pair of windows 9, 9 at mutually opposing positions on the outer peripheral surface thereof. Within the cylinder part 8, there is accommodated an engaging pawl member 11 to be engaged with the abovementioned inclined cam face 5 and which is constantly urged by an upwardly pushing force exerted from a compression coil spring 10. Both end parts 12 of the engaging pawl member 11 project outwardly of the windows 9, 9.

On the top end part of the barrel part 8, there is provided a dish-shaped partition plate 82 having a breather 81. An O-ring 84 is provided between a flanged part 83 of the dish-shaped partition plate 82 and another flanged part 72 of the barrel part 8 forming the bottom part of the cap head part 7 to thereby prevent the fuel from leaking out of the fitted part of the partition plate 82 and barrel part 8. A reference numeral 61 designates a breather formed on the head part 7, and a numeral 85 refers to an exit orifice for preventing the fuel from residing in the bottom section of the barrel part 8.

In the above-described construction of the conventional closure cap device, for the closure cap to be tightened to close the fuel feeding port without possible leakage of fuel, there is interposed a sealing member 14 between the lower surface 71 of the cap head part 7 and the inwardly extended flanged part 4 of the mouth piece 3. The cap barrel part 8 is plugged into the mouth piece 3 by causing both end parts 12, 12 of the pawl member 11 of the cap 6 to pass through a notched portion (not shown in the drawing) formed in the inwardly extended flanged part 4 of the mouth piece 3. And then, when the cap 6 is turned in one direction, the upper surface of the end part 12 of the pawl member 11 becomes engaged with the inclined cam face 5 formed at the lower surface of the inwardly extended flanged part 4 of the mouth piece 3, whereby the coil spring 10 is compressed, by repulsion force of which compression of the sealing member 14 and engagement between the inclined cam face 5 and the pawl member 11 are accomplished. When, on the other hand, the closure cap 6 is to be loosened, it is only sufficient that the cap 6 may be turned to the reverse direction.

Figure 2:
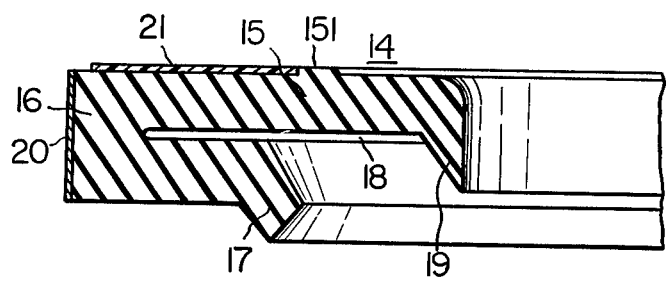
FIG. 2 is a partial cross-sectional view of the sealing member.

The present invention is concerned with an improvement in the conventional device of the afore-described construction by forming the flanged part of the fuel feeding port and the sealing member in a particular configuration. That is to say, a ring-shaped convex or raised part is defined at a position between the top peripheral edge 13 and the inwardly extended flanged part 4 of the mouth piece 3, both being formed integrally, as shown in FIG. 1. For the rubber sealing member 14, there is used one in such integral configuration that is composed, as shown in FIG. 2, of a ring-shaped flat plate part 15 which is intimately contacted to at least the lower surface part 71 of the closure cap 6, a ring-shaped lip part 17 which is formed in a downward inclination, is joined to the lower part of the flat plate part 15 through a connecting part 16, and is intimately contacted to a downwardly inclined inner peripheral surface of the ring-shaped raised part 13 of the abovementioned mouth piece 3, and a ring-shaped slit 18 defined in the inner peripheral surface of the abovementioned connecting part 16 and between the flat plate part 15 and the lip part 17. By the way, the rubber sealing member 14 as illustrated in the drawing additionally possesses a second ring-shaped lip part 19 formed on the inner periphery of the ring-shaped flat plate part 15 which is intimately contacted to the outer peripheral surface of the abovementioned cylinder or barrel part 8 of the closure cap 6. Further, on the outer peripheral surface of the rubber sealing member 14, there is provided a reinforcement ring 20 such as, for example, metal ring, and so forth, to prevent the sealing member 14 from bulging outward. In addition, an annular metal slider disc 21 made of a material of a low frictional coefficient is interposed between the lower surface 71 of the head part 7 of the closure cap 6 and the flat plate part 15. An annular raised part 151 is formed on the upper surface of the flat plate part 15 in the inner periphery of the annular metal slider disc 21, and the top surface of this raised part 151 intimately contacts with the lower surface 71 of the cap head part 7.

In the above-described construction, when the internal pressure (i.e., vapor pressure) within the tank 1 becomes increased, the lip part 17 of the rubber sealing member 14 receives the internal pressure, and intimately contacts with the downwardly inclined inner peripheral surface of the ring-shaped raised part 13 of the mouth piece 3 by the opening action of the slit 18. At the same time, the annular raised part 151 of the flat plate part 15 is intimately contacted to the lower surface 71 of the cap head part 7, while the second ring-shaped lip part 19 is intimately contacted to the outer peripheral surface of the cap barrel part 8.

Since this self-sealing effect becomes augmented in accordance with increase in the internal pressure in the fuel tank, any possible leakage of the fuel vapor can be satisfactorily prevented.

In lieu of utilizing the abovementioned reinforcement ring 20, it is also possible to construct the closure cap device according to the present invention in such a fashion that the lower skirt of the head part 7 of the cap 6 is further extended downward so as to enclose the outer peripheral surface of the sealing member 14.

Figure 3:
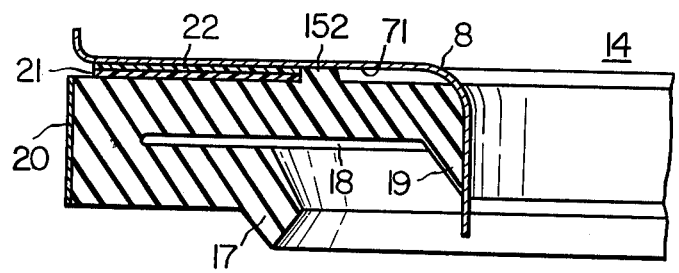
FIG. 3 is also a partial cross-sectional view of a modified embodiment of the sealing member according to the present invention.

The abovementioned annular metal slider disc 21 of low frictional coefficient is used for securing smooth sliding between the lower surface 71 of the head part 7 of the closure cap 6 and the sealing member 14 at the time of fitting and removing of the closure cap 6, hence it should preferably be made of such synthetic resin materials as represented by, for example, tetrafluoroethylene resin, or such low melting point metal as represented by copper, lead, and others. By the use of this annular metal slider disc 21, wear and tear of the sealing member 14 can be well prevented, whereby its service life (or durability) can be prolonged. While the abovementioned annular metal slider disc 21 may be merely interposed between the sealing member 14 and the lower surface 71 of the head part 7 of the closure cap 6, it may also be adhered to the upper surface of the flat plate part 15 of the sealing member 14. Also, as shown in FIG. 3, when an additional piece of an annular metal slider disc 22 made of the same kind of material as the disc 21, hence having the same low frictional coefficient, is provided on the lower surface 71 of the head part 7 of the cap 6 in confrontation to the annular metal slide disc 21, the sliding action between the cap 6 and the sealing member 14 becomes much more smooth. In this case, height of the ring-shaped raised part 152 on the upper surface of the flat plate part of the sealing member 14 is made substantially equal to a thickness of the annular metal slider disc for two pieces and the slider disc 22 is adhered to the lower surface 71 of the head part 7 of the closure cap 6, although when the sealing member having the second ring-shaped lip part 19 is used, the height of the ring-shaped raised part 152 may even be the same as that shown in FIG. 2.

Thus, as has been described in the foregoing, the closure cap device according to the present invention is not only applicable to the fuel storing tank for motorcycle as mentioned above, but also it can be applied to various types of storing vessels or reservoirs for other volatile liquid.

Although the present invention has been described with particular reference to a preferred embodiment thereof, it should be understood that the embodiment is merely illustrative and the invention is not limited to this embodiment alone, but any changes and modifications may be made by skilled persons in the art within an extent that does not exceed the spirit and scope of the present invention as set forth in the appended claims.

What is claimed is:

1. A closure cap device for a liquid storing tank which comprises in combination:
    (a) a liquid storing tank having a liquid filling port formed in one part thereof;
    (b) a closure cap to close said liquid filling port;
    (c) a sealing member interposed between the lower surface of said closure cap and a flanged part formed on said liquid filling port, said sealing member being in such a configuration that is composed integrally of a ring-shaped raised part formed on the flanged part of said liquid filling port of said liquid storing tank, a ring-shaped flat plate part to intimately contact with the lower surface of said closure cap, a ring-shaped lip part below the lower part of said ring-shaped flat plate part and integrally joined thereto by a connecting part and intimately contacted with a peripheral surface of said ring-shaped raised part, and a ring-shaped slit formed in the inner peripheral surface of said connecting part and between the lower surface of said flat plate part and the upper surface of said lip part.

2. The closure cap device for a liquid storing tank as set forth in claim 1, in which at least a piece of an annular disc member made of a material of low frictional coefficient is interposed between the lower surface of said closure cap and said ring-shaped flat plate part of said sealing member.

3. The closure cap device for a liquid storing tank as set forth in claim 2, in which said annular disc member of a material of low frictional coefficient is made of a synthetic resin material.

4. The closure cap device for a liquid storing tank as set forth in claim 3, in which said annular disc member of low frictional coefficient is made of tetrafluoroethylene.

5. The closure cap device for liquid storing tank as set forth in claim 2, in which said annular disc member of low frictional coefficient is made of a low melting point metal.

6. The closure cap device for a liquid storing tank as set forth in claim 5, in which said annular disc member of low frictional coefficient is made of a metal material selected from the group consisting of copper and lead.

7. The closure cap device for a liquid storing tank as set forth in claim 1, in which a piece of the low frictional coefficient annular disc member is provided on each of the inner surface of said cap and the ring-shaped flat plate part of said sealing member in a mutually opposed relationship.

8. A closure cap device for a liquid storing tank which comprises in combination:
    (a) a storing vessel for volatile liquid having a liquid filling port formed in one part thereof;
    (b) a mouth piece fitted in said liquid filling port and having an inwardly extending flanged part;
    (c) a rivet-shaped closure cap for closing said liquid filling port, said cap having a head part, and a barrel part which is to be inserted into said liquid filling port through said mouth piece and is provided with means to engage said closure cap per se with said inwardly extending flanged part of said mouth piece in said liquid filling port;
    (d) a sealing member interposed between the lower surface of the head part of said closure cap and the inwardly extended flanged part of said liquid filling port;
    (e) a ring-shaped raised part defined between the top peripheral edge of said mouth piece and the inwardly extending flanged part thereof;
    (f) a ring-shaped flat plate part forming a part of said sealing member and intimately contacted with the lower surface of the head part of said closure cap;
    (g) a first ring-shaped lip part also forming an integral part of said sealing member, and intimately contacted with the downwardly inclined inner peripheral surface of said ring-shaped raised part defined between the top periphery of said mouth piece and the inwardly extending flanged part, said first ring-shaped lip part being joined to the lower part of the outer periphery of said flat plate part through a connecting part;
    (h) a second ring-shaped lip part also forming an integral part of said sealing member and intimately contacted with the outer peripheral surface of the barrel part of said closure cap, said second ring-shaped lip part being joined to the inner periphery of said flat plate part; and
    (j) a ring-shaped slit defined in the inner peripheral surface of said connecting part, and between the lower surface of said flat plate part and said lip part.

9. The closure cap device for a liquid storing vessel as set forth in claim 8, in which at least a piece of an annular slider disc member having a low frictional coefficient is interposed between the lower surface of the head part of said closure cap and said ring-shaped flat plate part.

10. The closure cap device for a liquid storing tank as set forth in claim 9, in which said annular disc member of low frictional coefficient is made of a synthetic resin material.

11. The closure cap device for a liquid storing tank as set forth in claim 10, in which said annular disc member of low frictional coefficient is made of tetrafluoroethylene resin.

12. The closure cap device for a liquid storing tank as set forth in claim 9, in which said annular disc member of low frictional coefficient is made of a low melting point metal.

13. The closure cap device for a liquid storing tank as set forth in claim 12, in which said annular disc member of low frictional coefficient is made of a metal material selected from the group consisting of copper and lead.

14. The closure cap device for a liquid storing tank as set forth in claim 9, in which a piece of the low frictional coefficient annular disc member is provided on each of the inner surface of said cap and the ring-shaped flat plate part of said sealing member in a mutually opposed relationship.

15. In a closure cap device for a liquid storing vessel or tank comprising a liquid storing vessel having a liquid filling port formed in one part thereof, a mouth piece fitted in said liquid filling port and having an inwardly extending flanged part, a closure cap for closing said liquid filling port through said mouth piece, and a sealing member interposed between the lower surface of said closure cap and the inwardly extending flanged part of said liquid filling port, improvement wherein the inwardly extending flanged part of said mouth piece fitted in said liquid filling port of said liquid storing vessel has as the integral parts thereof a ring-shaped raised part defined at a position between the top periphery of said mouth piece and said inwardly extending flanged part, and said sealing member is in such a configuration that is integrally composed of a ring-shaped flat plate part to be intimately contacted with the lower surface of said closure cap, a ring-shaped lip part which is joined to the lower part of said flat plate part through a connecting part, and intimately contacted with the downwardly inclined inner peripheral surface of said ring-shaped raised part defined between the top peripheral edge of said mouth piece and the inwardly extending flanged part, and a ring-shaped slit defined in the inner peripheral surface of said connecting part and between the lower surface of said flat plate part and the upper surface of said lip part.

16. The closure cap device for a liquid storing tank as set forth in claim 15, in which at least a piece of an annular disc member made of a material of low frictional coefficient is interposed between the lower surface of said closure cap and said ring-shaped flat plate part of said sealing member.

17. The closure cap device for a liquid storing tank as set forth in claim 16, in which said annular disc member of low frictional coefficient is made of a synthetic resin material.

18. The closure cap device for a liquid storing tank as set forth in claim 17, in which said annular disc member of low frictional coefficient is made of tetrafluoroethylene resin.

19. The closure cap device for a liquid storing tank as set forth in claim 16, in which said annular disc member of low frictional coefficient is made of a low melting point metal.

20. The closure cap device for a liquid storing tank as set forth in claim 19, in which said annular disc member of low frictional coefficient is made of a metal material selected from the group consisting of copper and lead.

21. The closure cap device for a liquid storing tank as set forth in claim 15, in which a piece of the low frictional coefficient annular disc member is provided on each of the inner surface of said cap and the ring-shaped flat plate part of said sealing member in a mutually opposed relationship.

22. In a closure cap device for a volatile liquid storing tank comprising a storing tank for the volatile liquid having a liquid filling port formed in an apprpriate part thereof, a mouth piece fitted in said liquid filling port and having an inwardly extending flanged part, a rivet-shaped closure cap having a head part and a barrel part to be fitted into said liquid filling port through said mouth piece and having means to engage the cap per se with the inwardly extending flanged part of said mouth piece in said liquid filling port, and a sealing member interposed between the lower surface of said cap head part and the inwardly extending flanged part of said liquid filling port, the improvement wherein the inwardly extending flanged part of said mouth piece fitted in said liquid filling port of said liquid storage vessel is provided with a ring-shaped raised part defined at a position between the top peripheral edge of said mouth piece and said inwardly extending flanged part, and said sealing member is in such a configuration that is integrally composed of a ring-shaped flat plate part to be intimately contacted with the lower surface of said cap head part, a first ring-shaped lip part joined to the lower part of the outer periphery of said flat plate part through a connecting part and intimately contacted with the downwardly inclined inner peripheral surface of said ring-shaped raised part defined between the top edge of said mouth piece and the inwardly extending flanged part, a second ring-shaped lip part joined to the inner periphery of said flat plate part and intimately contacted with the outer peripheral surface of said barrel part of said closure cap, and a ring-shaped slit defined in the inner peripheral surface of said connecting member, and between the lower surface of said flat plate part and the upper surface of said lip part.

23. The closure cap device for a liquid storing vessel as set forth in claim 22, in which at least a piece of an annular slider disc member having a low frictional coefficient is interposed between the lower surface of the head part of said closure cap and said ring-shaped flat plate part.

24. The closure cap device for a liquid storing tank as set forth in claim 23, in which said annular disc member of low frictional coefficient is made of a synthetic resin material.

25. The closure cap device for a liquid storing tank as set forth in claim 24, in which said annular disc member of low frictional coefficient is made of tetrafluoroethylene resin.

26. The closure cap device for a liquid storing tank as set forth in claim 23, in which said annular disc member of low frictional coefficient is made of a low melting point metal.

27. The closure cap device for a liquid storing tank as set forth in claim 26, in which said annular disc member of low frictional coefficient is made of a metal material selected from the group consisting of copper and lead.

28. The closure cap device for a liquid storing tank as set forth in claim 22, in which a piece of the low frictional coefficient annular disc member is provided on each of the inner surface of said cap and the ring-shaped flat plate part of said sealing member in a mutually opposed relationship.

* * * * *